INVENTOR
LESTER J. REITMAN
BY
ATTORNEY

April 10, 1962 L. J. REITMAN 3,028,880
FLUID FLOW CONTROL VALVE
Filed April 5, 1960 2 Sheets-Sheet 2

INVENTOR
LESTER J. REITMAN
BY
ATTORNEY

United States Patent Office 3,028,880
Patented Apr. 10, 1962

3,028,880
FLUID FLOW CONTROL VALVE
Lester J. Reitman, Long Beach, N.Y., assignor to Sperry Rand Corporation, Great Neck, N.Y., a corporation of Delaware
Filed Apr. 5, 1960, Ser. No. 20,119
3 Claims. (Cl. 137—622)

The present invention relates to fluid flow control valves for fluid servo systems.

Fluid operated servo systems generally include a fluid sump or reservoir, a pump for circulating the fluid through the system and a reversible hydraulic actuator activated by the circulating fluid and employed to supply motive power to a load. The direction and rate of operation of the reversible hydraulic actuator is dependent upon the magnitude and direction of flow of fluid therethrough which is controlled by a fluid flow control or servo valve. The servo valve is itslf operated by a signal responsive control means under the control of an operator or automatic signal producing means. The servo valve controls the rate and direction of flow of the fluid through the positioning of a member which is controlled by the signal responsive control means.

For purposes of convenience, the present invention will be described with respect to an electrohydraulic servo valve which converts an electrical control signal having a magnitude and sense into a controlled fluid flow having a flow rate and direction proportional to the electrical control signal. It will be appreciated however, that the control signal and the control means may be other than electrical and the fluid may be other than liquid.

The servo valve of the present invention is an improvement over that described in U.S. patent application Serial No. 645,247 entitled, Electro-hydraulic Servo Control Valve, of Robert A. Moffatt filed on March 11, 1957, now Patent No. 2,936,783 issued on May 17, 1960. The servo valve of the present invention enjoys a number of advantages over the prior art including (1) it is less sensitive to dimensional changes over a wide temperature variation, (2) both frequency response and stability of the present servo valve are relatively unaffected by changes in temperature over a wide temperature range, (3) greater reliability is obtained without maintaining close manufacturing tolerances, (4) the metering edges of the servo valve are easily and economically restored by merely resurfacing the valve elements, (5) the direction of fluid flow through the servo valve is in a direction that aids the valve stability and motion, (6) it is relatively insensitive to acceleration forces because of its high valve stiffness and torque motor natural frequency which exists over a wide temperature range, and (7) by interchanging the shuttle valve, the fluid flow capacity and other characteristics of the servo valve may be readily varied.

It is a primary object of the present invention to provide a servo valve which is essentially unaffected by temperaure changes over a wide temperature range and is economical to manufacture and reliable.

It is a further object of the present invention to provide a servo valve that is relatively insensitive to acceleration forces and stable over a wide temperature range.

It is an additional object of the present invention to provide a servo valve in which the direction of fluid flow through the valve is in a direction which aids the valve motion.

It is a further object of the present invention to provide a servo valve in which the metering edges may be readily and economically restored.

Another object of the present invention is to provide a servo valve adaptable to both gaseous and liquid fluids having an interchangeable metering element by means of which the flow capacity and other characteristics of the servo valve may be varied.

The foregoing objects are achieved by the servo valve of the present invention which consists of first, second and third flat plates with the second plate disposed intermediate the first and third plates. The second plate has a cavity within which a valve shuttle is slideably disposed. At least one of the other plates has fluid supply, return and control ports communicating with the cavity at axially spaced locations. The valve shuttle is a flat plate having portions thereof cooperative with the ports for controlling fluid flow through the ports. Passages conduct fluid from the supply ports to chambers at each end of the valve shuttle. First and second nozzles mounted on the valve shuttle each communicate with a different one of the chambers. A positionable V-shaped flapper is cooperative with the nozzles for differentially varying the flow through the nozzles thereby varying the pressure differential in the chambers for causing movement of the valve shuttle in accordance with the flapper movement. The fluid supply, return and control ports and the portions of the valve shuttle cooperative therewith are arranged for conducting fluid flow through the valve in a direction to aid the movement of the valve shuttle.

The above and other objects of the invention will become apparent from the following description when taken in conjunction with the accompanying drawings wherein like reference numerals refer to similar parts throughout the several views of which:

Figure 1:
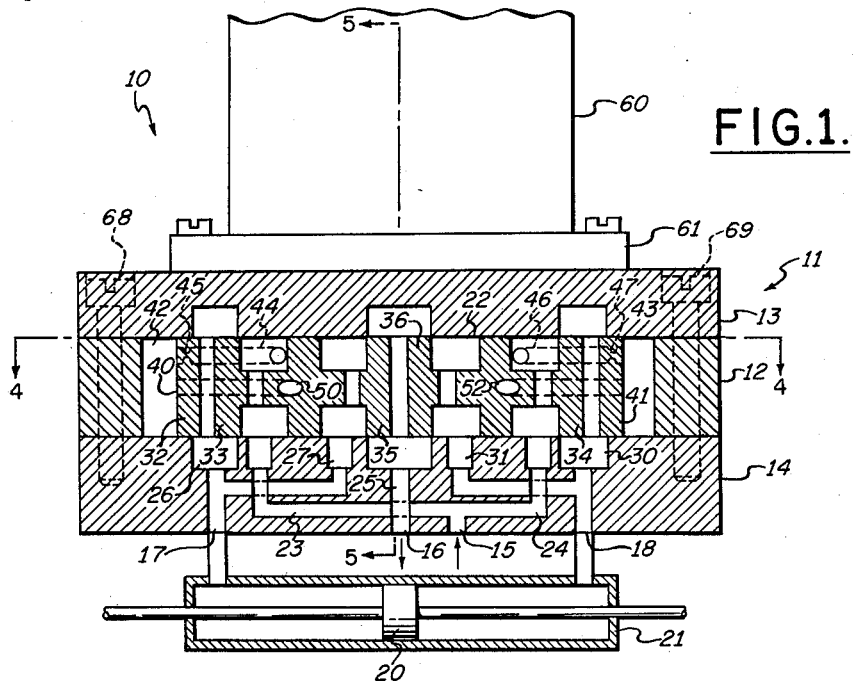
FIG. 1 is a front elevation view partly in section of a preferred embodiment of the electrohydraulic servo valve of the present invention with the valve shuttle centered.

Referring now to FIG. 1 of the drawings, the electrohydraulic servo valve 10 of the present invention consists of a valve body 11 preferably formed by three flat plates. The center guide plate 12 is disposed intermediate a top plate 13 and a bottom manifold plate 14. The bottom face of the manifold plate 14 is provided with a pressure fluid supply port 15, a pressure fluid return port 16 and two pressure fluid control ports 17 and 18. The pressure fluid supply port 15 is adapted to be connected to a source of high pressure fluid (not shown) while the pressure fluid return port 16 is adapted to be connected to a fluid sump or reservoir (not shown). The pressure fluid control ports 17 and 18 may be connected to the opposite sides respectively of a double-acting piston 20 of a primary hydraulic actuator 21. The flow of fluid through the servo valve 10 thereby controls the operation of the primary actuator 21 which may, for example, be utilized to position the control surface of an airplane.

The fluid supply, return and control ports communicate with a cavity 22 within the guide plate 12 at axially spaced locations. Thus, the supply port 15 communicates with the cavity 22 by means of supply passages 23 and 24 while the return port 16 connects to the cavity 22 by means of return passage 25. The control port 17 communicates with the cavity 22 by means of control passages 26 and 27 while the control port 18 communicates therewith by means of control passages 30 and 31. A valve shuttle 32, preferably in the form of a flat plate, is slideably disposed within the cavity 22 to control the fluid flow through the aforementioned ports in the manner described immediately below.

With the valve shuttle 32 centered as shown in FIG. 1, its lands 33 and 34 block the flow of supply fluid from the supply passages 23 and 24 to the control passages 26 and 30 respectively while lands 35 and 36 prevent the flow of fluid from the control passages 27 and 31 respectively to the return passage 25.

Figure 2:
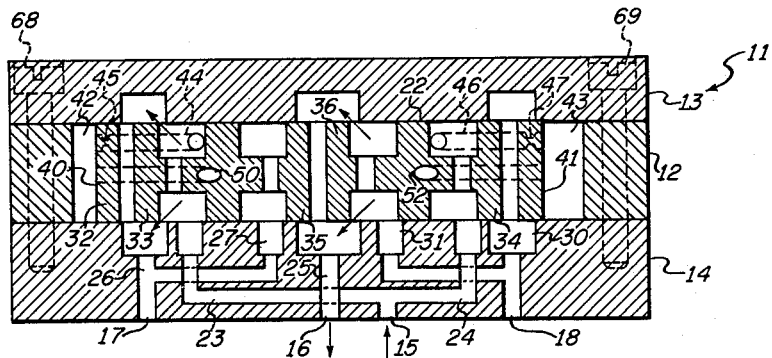
FIG. 2 is a view similar to FIG. 1 with the valve shuttle to the left of its centered position.

With the valve shuttle 32 moved to the left of its centered position as shown in FIG. 2, the land 33 permits the flow of supply fluid from the supply passage 23 to the control passage 26 and thence through the control port 17 to the left side of the double-acting piston 20. Simultaneously, land 36 permits the flow of fluid from the right side of the double acting piston 20 through the control port 18, control passage 31 and into the return passage 25. In this position, the land 34 prevents supply fluid from the supply passage 24 from entering the control passage 30 while the land 35 prevents the control passage 27 from connecting to the return passage 25. It will be noted that the flow of fluid through the valve 10, as indicated by the arrows, is in a direction to aid the movement of the valve shuttle 32, i.e. to the left, while the rate of fluid flow depends upon the extent of the movement of the valve shuttle 32.

Figure 3:
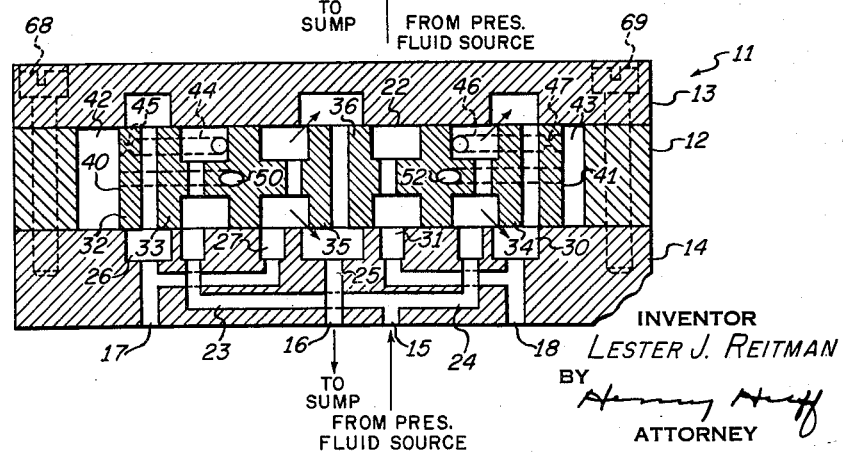
FIG. 3 is a view similar to FIG. 1 with the valve shuttle to the right of its centered position.

Referring now to FIG. 3, with the valve shuttle 32 to the right of its centered position as shown, land 34 permits the supply passage 24 to connect with the control passage 30, the control port 18 and the right side of the piston 20. Simultaneously the land 35 permits the control passage 27 to connect with the return passage 25 to exhaust the fluid from the left side of the piston 20. In this position, the land 33 prevents the flow of fluid from the supply passage 23 to the control passage 26 while the land 36 prevents the flow of fluid from the control passage 31 to the return passage 25. It will be noted that the flow of fluid is again in a direction to aid the movement of the valve shuttle 32, i.e. to the right, as indicated by the arrows.

Figure 4:
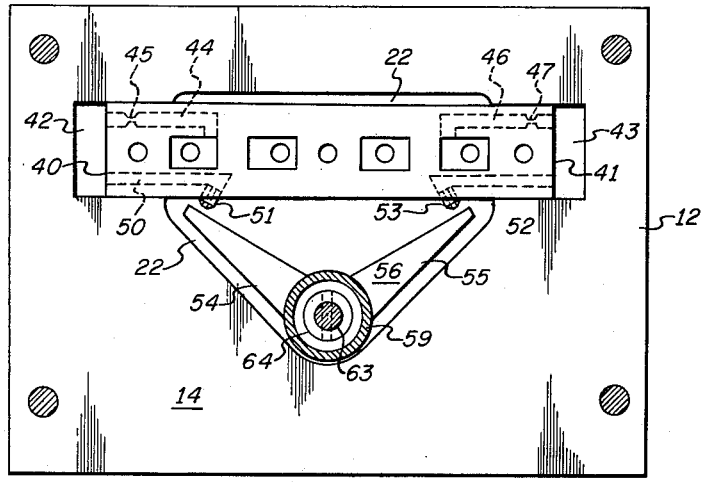
FIG. 4 is a top plan view of the valve in section taken along line 4—4 of FIG. 1 showing the flapper and nozzle arrangement.

Referring now to FIGS. 1 and 4, end land portions 40 and 41 of the valve shuttle 32 cooperate with the plates 12, 13 and 14 to form pressure fluid chambers 42 and 43, respectively. The supply passage 23 communicates with the pressure chamber 42 by means of a conduit 44 through a pressure reducing orifice 45 while the supply passage 24 communicates with the pressure chamber 43 by means of a conduit 46 through a pressure reducing orifice 47. The pressure chamber 42 communicates by means of a conduit 50 to a variable area nozzle 51 on the side of the valve shuttle 32. Similarly, the pressure chamber 43 communicates by means of a conduit 52 to a similar variable area nozzle 53 mounted on the same side of the valve shuttle 32 as the nozzle 51.

The nozzles 51 and 53 are mounted proximate the extremities of the outwardly extending arms 54 and 55 respectively, of a V-shaped flapper 56. The nozzles 51 and 53 cooperate with the flapper 56 to cause a fluid jet stream from each of the nozzles to impinge upon the associated arm of the flapper 56 in a direction that is substantially perpendicular to the plane defined by the cooperative portion of the associated arm. With the flapper 56 centered as shown in FIG. 4, the flow through each of the nozzles 51 and 53 is equal. While the diameter of each of the nozzles 51 and 53 is fixed, the movement of the arms 54 and 55 toward or away from its associated nozzle decreases or increases the space between the particular arm and its nozzle to provide a lesser or greater peripheral area respectively, for the flow of fluid. Thus, as the flapper 56 is rotated, and one arm moves toward a particular nozzle the flow from that nozzle is decreased while the flow from the other nozzle is increased. As a result, the pressure will increase within the nozzle from which there is a decreased flow and will decrease within the other nozzle. This pressure differential is reflected back to the pressure chambers 42 and 43 to create a differential pressure therebetween causing the valve shuttle 32 to move in the direction of the lower pressure.

The movement of the valve shuttle 32 is in a direction to equalize the flow of fluid through the nozzles 51 and 53 and thus equalize the pressures in the pressure chambers 42 and 43. For example, with the flapper 56 rotated counterclockwise by means to be described, the arm 55 will tend to reduce the peripheral flow area of the nozzle 53 while the arm 54 is tending to increase that of the nozzle 51 thereby increasing the pressure in the pressure chamber 43 and reducing it in the pressure chamber 42 causing the valve shuttle 32 to move to the left as shown in FIG. 2. The leftward movement of the valve shuttle 32 carries with it the nozzles 51 and 53. With the flapper 56 remaining fixed, the valve shuttle 32 comes to rest in a position where the peripheral flow areas of the nozzles 51 and 53 are again equal resulting in equal pressures in the pressure chambers 42 and 43. Similarly, movement of the flapper 56 in a clockwise direction causes the valve shuttle 32 to move to the right as shown in FIG. 3 until the peripheral flow areas of the nozzles 51 and 53 are again equal.

Upon a return of the flapper 56 to its centered position, the pressure equilibrium existing in the pressure chambers 42 and 43 is again upset and the valve shuttle 32 will move from its disturbed position to its centered position once again creating an equilibrium condition.

Figure 5:
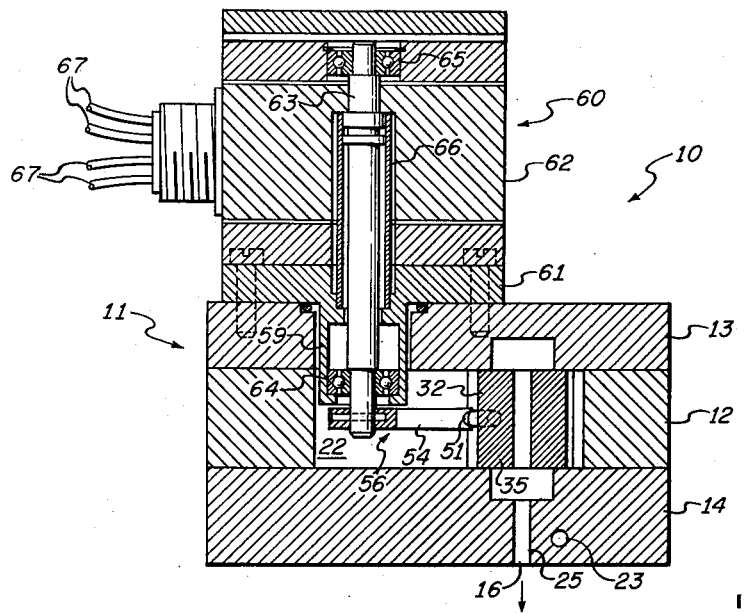
FIG. 5 is a side elevation view of the valve partly in section taken along line 5—5 of FIG. 4.

As shown more clearly in FIG. 5, the flapper 56 may be actuated by a torque motor 60 mounted on the valve body 11 by means of a support member 61 that is secured to the top plate 13. A hollow cylindrical portion 59 of the support member 61 extends into the cavity 22. The armature 62 of the torque motor 60 is connected to the flapper 56 by means of a shaft 63. The shaft is mounted for rotation about its longitudinal axis by means of spaced bearings 64 and 65. The shaft 63 is fitted within a torsion tube 66 and connected to one extremity of the torsion tube 66 by means of a leak-proof connection. The other extremity of the torsion tube 66 is connected to the support member 61 also by means of a leak-proof connection. The torsion tube 66 hydraulically seals the torque motor 60 from the pressure fluid and also serves as the centering spring for the torque motor armature and flapper assembly. Electrical control signals received on leads 67 control the operation of the torque motor 60.

In the operation of the present invention, a differential electrical control signal is applied to the torque motor 60 by means of the leads 67 which differentially changes the flux fields of the torque motor 60 in a conventional manner creating the force to rotate the armature 62 of the motor. The rotation of the armature 62 torsionally stresses the torsion tube 66 and rotates the flapper 56 creating a differential flow through the nozzles 51 and 53 causing a differential pressure at the nozzles 51 and 53. When this load balances the force due to the electrical control signal, the armature 62 stops rotating. The opening of one nozzle and the closing of the other nozzle by the arms of the flapper 56 creates a differential pressure in the pressure chambers 42 and 43 as explained above. This differential pressure operating against the end land portions 40 and 41 of the valve shuttle 32 displaces the valve shuttle 32 from its centered position until the pressures in the pressure chambers 42 and 43 are again equalized, at which time the valve shuttle 32 is in a new position in a state of equilibrium. The displacement of the valve 32 controls the flow of fluid to and from the hydraulic actuator 21 in a manner fully explained above causing the piston 20 thereof to be actuated accordingly. As the electrical control signal goes to zero, the torque exerted by the torsion tube 66 returns the flapper 56 to its centered position which creates a differential pressure in the pressure chambers 42 and 43 that returns the valve shuttle 32 to its centered position whereupon equilibrium is restored.

It will be appreciated that varying the angle between the oppositely extending arms 54 and 55 of the flapper 56 will vary the linear displacement of the valve shuttle 32 for a given arcuate rotation of the flapper 56. The greater the angle, the greater the linear movement of the valve shuttle 32 for a given rotation of the flapper 56.

It will be further appreciated that all of the edges of the valve which control fluid flow, i.e., the metering edges, which receive the most wear are on the flat surfaces of the valve shuttle 32 and the plates 13 and 14. The metering edges can thus be easily and economically restored by resurfacing the flat surfaces of the valve shuttle 32 and the plates 13 and 14. By resurfacing the valve shuttle 32 and the guide plate 12 by the same amount, the manufacturing tolerances can be maintained and the valve may be readily reassembled by means of screws 68 and 69 to exhibit the same flow characteristics as previously. This cannot be accomplished with a servo valve having a cylindrical valve spool instead of a flat plate valve shuttle.

The fluid flow capacity of the servo valve 10 is easily changed by interchanging the valve shuttle 32 with another valve shuttle in which the width of the metering edges are either increased or decreased to provide increased or decreased flow respectively. Further the valve pressure gain and response characteristics can be readily changed by replacing the valve shuttle 32 with another valve shuttle in which the underlap or overlap of the supply and return metering edges are either increased or decreased.

The servo valve 10 may be utilized with servo systems using either hydraulic or gaseous fluids because it does not have any elastomer or O ring seals which would otherwise prohibit such use, since hot gases and some hydraulic fluids cause rapid deterioration of elastomer seals.

Preferably, the fluid passages within the valve shuttle 32, those on the surfaces thereof, and those associated therewith are symmetrically disposed to thereby prevent the development of undesirable unbalanced forces on the valve shuttle 32 due to unbalanced fluid pressures and fluid flow.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A servo control valve comprising a valve body having a cavity and fluid supply, return and control ports communicating with said cavity at axially spaced locations, a valve shuttle slideably disposed in said cavity for controlling fluid flow through said ports, a chamber at each end of said valve shuttle, restricted passage means for conducting said fluid from said supply ports to said chambers, first and second nozzles mounted on said valve shuttle, each of said nozzles being in fluid communication with a different one of said chambers, means including a positionable V-shaped flapper having extending arms that cooperate with said nozzles for differentially varying the flow through said nozzles in accordance with the movement of said flapper thereby varying the pressure differential in said chambers causing a change in the position of said valve shuttle proportional to the movement of said flapper, the angle between said arms defining the ratio of the movement of said valve shuttle with respect to the movement of said flapper, and control means for positioning said flapper.

2. In a valve for controlling the flow of fluid to a device movable thereby in accordance with a control signal, a valve body having a cavity and fluid supply, return and control ports communicating with said cavity at axially spaced locations, a valve shuttle slideably disposed in said cavity for controlling fluid flow through said ports in accordance with the position of said valve shuttle within said cavity, said valve shuttle including end land portions adapted to form with the extremities of said cavity first and second pressure fluid chambers, said valve shuttle having first and second nozzles movable therewith, said first and second nozzles being connected to said first and second fluid chambers respectively, means including a positionable V-shaped flapper having extending arms cooperative with said nozzles for differentially varying the pressure in said pressure chambers in accordance with the movement of said flapper, the angle between said arms defining the ratio of the movement of said valve shuttle with respect to the movement of said flapper, and control means responsive to said control signal and operably coupled to said flapper for positioning said flapper by an amount and in a direction proportional to the magnitude and sense of said control signal.

3. A servo control valve as claimed in claim 2 in which said valve shuttle is interchangeable for varying the quantity and duration of fluid flow, said valve shuttle having straight metering edges, the width of which defines the quantity of fluid flow and the lapping of which defines the duration of said flow.

References Cited in the file of this patent

UNITED STATES PATENTS

| | | |
|---|---|---|
| 2,615,466 | Garde | Oct. 28, 1952 |
| 2,832,319 | Mason et al. | Apr. 29, 1958 |
| 2,936,783 | Moffatt | May 17, 1960 |
| 2,964,018 | Farron | Dec. 13, 1960 |